United States Patent
Perry et al.

(10) Patent No.: US 6,470,028 B1
(45) Date of Patent: Oct. 22, 2002

(54) SYSTEM AND METHOD FOR TRANSLATING TELECOMMUNICATIONS SIGNALS OF SPAN INTERFACES

(75) Inventors: Matthew C. Perry, Plano; Gary Leon Smith, Flower Mound; Stephen A. Harner, Frisco; Hong Li, Plano, all of TX (US)

(73) Assignee: Alcatel USA Sourcing, L.P., Plano, TX (US)

(*) Notice: Subject to any disclaimer, the term of this patent is extended or adjusted under 35 U.S.C. 154(b) by 0 days.

(21) Appl. No.: 09/175,063

(22) Filed: Oct. 19, 1998

(51) Int. Cl.[7] .............................................. H04M 11/00
(52) U.S. Cl. ...................................... 370/466; 370/419
(58) Field of Search ................................ 370/259, 354, 370/385, 524, 477, 217, 360, 466, 463, 419, 100.12, 100.13, 119, 118

(56) References Cited

U.S. PATENT DOCUMENTS

| | | | |
|---|---|---|---|
| 5,349,579 A | 9/1994 | Madonna et al. | 370/259 |
| 5,526,397 A | 6/1996 | Lohman | 370/477 |
| 5,596,569 A | 1/1997 | Madonna et al. | 370/217 |
| 6,073,158 A | * 6/2000 | Wolly et al. | 709/102 |

FOREIGN PATENT DOCUMENTS

GB 2061673 5/1981

OTHER PUBLICATIONS

"Multimode Signalling Memory for High–Speed Time–Division Multiplexing", IBM Technical Disclosure Bulletin, vol. 32 No. 10B, Mar. 1990, pp. 307–313.

* cited by examiner

Primary Examiner—Douglas Olms
Assistant Examiner—Ken Vanderpuye
(74) Attorney, Agent, or Firm—Baker Botts, LLP; V. Lawrence Sewell; Craig A. Hoersten

(57) ABSTRACT

A system for switching communications signals between a first communications network and a second communications network is provided. The system includes a J1 interface coupled to the first communications network by a J1 span, a E1 interface coupled to the second communications network by an E1 span, and an interface processor in communication with the J1 interface and the E1 interface. The interface processor is then operable to translate signals formatted for the J1 span into an E1 format for transmission on the E1 span. The interface processor is further operable to translate communications signals formatted for the E1 span into a J1 format for transmission on the J1 span.

26 Claims, 2 Drawing Sheets

SYSTEM AND METHOD FOR TRANSLATING TELECOMMUNICATIONS SIGNALS OF SPAN INTERFACES

TECHNICAL FIELD OF THE INVENTION

The invention relates in general to the field of telecommunications and more particularly to a system and method for translating telecommunications signals of span interfaces.

BACKGROUND OF THE INVENTION

Three principle telecommunications data format transported on communications spans are currently used in telecommunications networks. T1 is the data format utilized within the United States. E1 is the data format utilized in Europe and other international locations. J1 is the data format utilized in Japan.

In general, a T1 span refers to the transmission medium, regenerators, and terminating equipment that carry a 1.544 megabits per second digital signal between two points on 24 channels or time slots. The transmission medium may be copper, optical, and wireless. An E1 span refers to equivalent components that carry a 2.048 megabits per second digital signal between two points on 32 channels. An E1 span can transmit 30 data channels and two signaling channels. Likewise, a J1 span refers to equivalent components used to carry a 2.048 digital signal between two points also on 32 channels. A J1 span also uses 30 channels to carry data, and uses one of the remaining channels for group signaling.

Problems of compatibility and product availability arise because of the differences between these three data formats. Although T1, E1 and J1 data formats are all designed to handle similar data transfer using similar protocols and signaling, significant differences exist between their signaling and frame synchronization as to prohibit identical hardware equipment being used for all three span types in many cases. More specifically, a telecommunications network component may be developed for a specific span type or geographical market that only allows integration with a specific span type. One example of this problem has arisen regarding modifications and upgrades to existing telecommunications networks in Japan that utilize a J1 span type, and corresponding switching and associated hardware for interfacing with such telecommunications networks. One such recent Advancement is the development of Code Division Multiple Access ("CDMA") in wireless communications technologies. A CDMA upgrade dramatically increases the system capacity and service quality in wireless communications networks. CDMA transceivers replace the majority of traditional analog processing with a type of modulation that is largely applied and removed in the digital domain, and not on the basis of frequency. As a result of such advancements in wireless communications, product manufacturers and service providers are modifying existing components of wireless communications networks.

Although many of such manufacturers and service providers have more than enough market demand to justify modifying components that are specific to both E1 and T1 span types, the less widely utilized J1 span type may not be supported directly by newly developed hardware components. For example, some hardware components necessary to implement advancements such as CDMA are too expensive to justify three separate product lines for interacting with the E1, T1 and J1 span types. A problem arises as to how such developed components can be implemented in markets wherein the J1 span type is utilized.

SUMMARY OF THE INVENTION

Accordingly, a need has arisen for a system and method for translating span interfaces. The present invention provides a system and method for translating span interfaces that addresses the shortcomings of prior systems and methods.

In one aspect of the present invention, a system for switching communications signals between a first communications network and a second communications network is provided. The system includes a J1 interface coupled to the first communications network by a J1 span, an E1 interface coupled to the second communications network by an E1 span, and an interface processor in communication with the J1 interface and the E1 interface. The interface processor is then operable to translate signals formatted for the J1 span into an E1 format for transmission on the E1 span. The interface processor is further operable to translate communications signals formatted for the E1 span into a J1 format for transmission on the J1 span.

In another aspect of the invention, a method of switching communications signals includes receiving communications data from a span interface, storing the communications data in a memory according to a first memory map, receiving a request from a call processor which references the communications data by indicating an expected location according to a second memory map, translating the expected location into an actual location according to the first memory map, and responding to the request using the communications data stored at the actual location.

In yet another aspect of the present invention, a system for processing communications signals transferred between a first communications network and a second communications network is provided. A first span interface is coupled to the first communications network by a first digital communications link. The first digital communications link operable to transfer communications data in a first format. The first span interface is also operable to store the communications data according to the first format. The second span interface is coupled to the second communications network by a second digital communications link. The second digital communications link is operable to transfer communications data in a second format. The second span interface is operable to store the communications data according to the second format. An interface processor is in communication with the first span interface and the second span interface. The interface processor is configured to process communications data stored in the second format. The interface processor also includes a span convertor operable to translate the format of the communications data from the first format to the second format. This allows further processing of the communications data by the interface processor.

In yet another aspect of the present invention, a system for processing communications signals received from a communications network includes a span interface coupled to the communications network by a digital communications link. The digital communications link is operable to transfer communications data in a first format and the span interface is operable to store the communications data. A switching device coupled to the span interface includes a call processor configured to process communications data in a second format. A span interface processor then communicates with the span interface and the call processor. The span interface processor is operable to access the stored communications data and translate the accessed communications data from the first format to the second format in response to a data access request from the call processor.

In yet another aspect of the present invention, a system for processing communications signals received from a communications network includes a span interface coupled to the communications network by a digital communications link. A span interface processor in communication with the span interface is operable to receive communications data from the span interface that has been transferred to the span interface across the digital communications link. The span interface processor is operable to store the communications data in a memory according to a first memory map. The span interface processor includes a call processor which is operable to generate a call processing request that references the stored communications data by indicating an expected location according to a second memory map. The span interface processor also includes a span convertor in communication with the call processor and the memory. The span convertor is operable to respond to the request by translating the expected location into an actual location according to the first memory map and by using the communications data stored at the actual location.

BRIEF DESCRIPTION OF THE DRAWINGS

A more complete understanding of the invention and its advantages will be apparent from the detailed description taken in connection with the accompanying drawings in which.

DETAILED DESCRIPTION OF THE INVENTION

Embodiments of the present invention and its advantages are best understood by referring to FIGS. 1–5 of the drawings, like numerals being used for like and corresponding parts of the various drawings.

Figure 1:
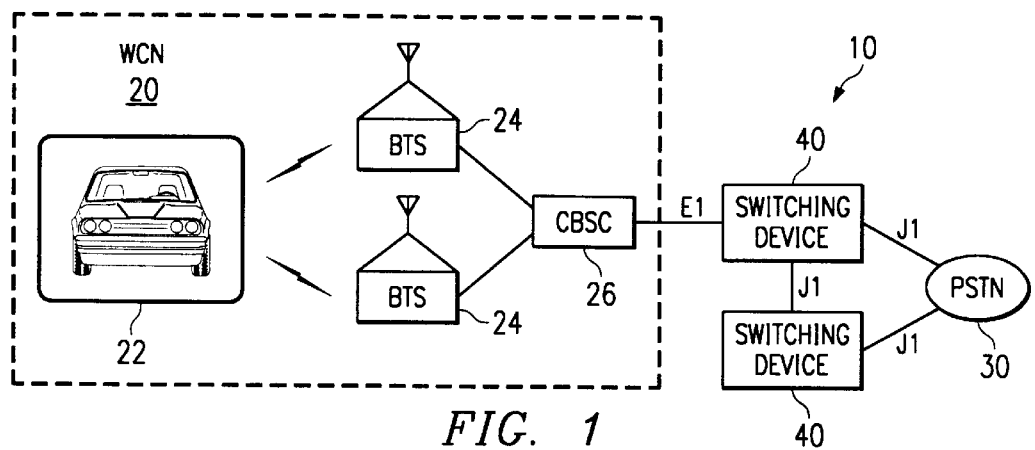
FIG. 1 is a block diagram of a telecommunications network including a wireless communications network in communication with a public switching telecommunications network through a switching device according to the teachings of the present invention.

FIG. 1 is a block diagram of a telecommunications network 10 including a wireless communications network (WCN) 20 in communication with a public switching telecommunications network (PSTN) 30 through a switching device 40. In general, switching devices 40 enable wireless communications network 20 transporting signals in a first data format to communicate with public switching telecommunications network 30 transporting signals in a second data format without modifying any of the components of wireless communications network 20. For example, wireless communication network 20 may use E1 spans and public switching telecommunication network 30 may use J1 spans. Therefore, switching devices 40 are capable of interfacing with both E1 and J1 spans and processing communications signals of both data formats.

Wireless communications network 20 may include a plurality of mobile units 22 in communication with one or more base transceiver systems (BTS) 24 which are in turn in communication with a centralized base site controller (CBSC) 26.

Public switching telecommunications network 30 is a telecommunications network having the capability of communicating voice, data, and/or video between a plurality of endpoints. Public switching telecommunications network 30 includes the capability of receiving, routing, switching, and transmitting communications traffic so as to enable communications between the plurality of endpoints.

Switching devices 40 include sufficient hardware and software components to interface with J1 and E1 spans and switch communications signals originating from either network. Switching devices 40 perform call processing applications on communications traffic received and transmitted over both spans. Switching devices 40 can transmit communications signals originating from public switching telecommunications network 30 to other telecommunications networks such as wireless telecommunications network 20. Switching devices 40 may perform call processing and other necessary functions as if all communications data is in one particular format such as J1. Thus, switching devices 40 further include software and hardware capable of accessing E1 formatted communications data that is received from centralized base site controller 26 across an E1 span and translating such communications data into the J1 format. This translation enables switching devices 40 to use the translated E1 communications data from wireless telecommunications network 20 for call processing applications or for establishing communication across J1 spans to public switching telecommunications network 30. Switching device 40 may also communicate with other switching devices 40 over J1 spans.

Figure 2:
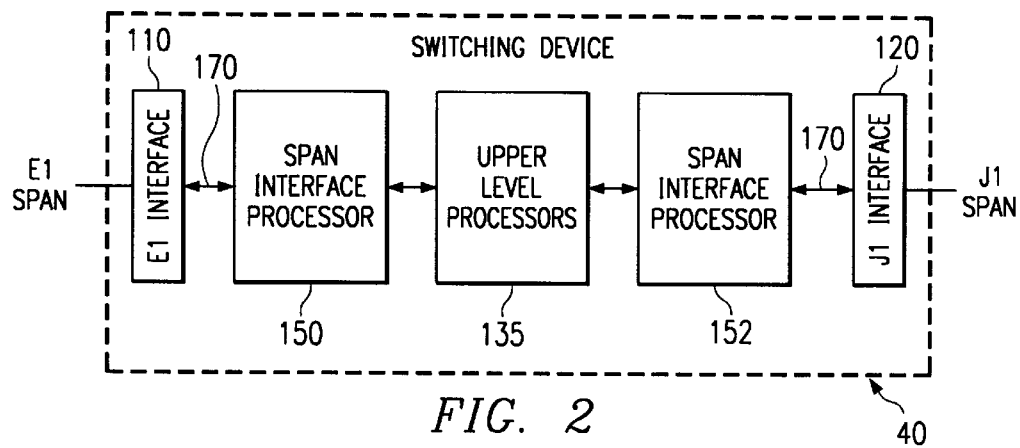
FIG. 2 is a block diagram illustrating the operation of the switching device shown in FIG. 1.

FIG. 2 is a block diagram illustrating the operation of switching devices 40 shown in FIG. 1. Switching devices 40 allow the switching of communications signals between E1 and J1 spans. Each switching device 40 includes an E1 interface 110, a first and second span interface processors 150 and 152, upper level processors 135, and a J1 interface 120. For purposes of FIGS. 2 and 3 and the remainder of this disclosure span interfaces such as E1 interface 110 and J1 interface 120 may either be part of switching device 40 or a peripheral interface coupled to switching device 40. E1 interface 110 is coupled to at least one E1 span. Each E1 interface 110 is in communication with first span interface processor 150 across a first bus 170. First span interface processor 150 is also in communication with upper level processors 135, that in turn communicate with second span interface processor 152. Second span interface processor 152 is in also communication with J1 interface 120 across a second bus 170. J1 interface 120 is coupled to at least one J1 span.

In general, first span interface processor 150 processes communications data received across E1 interface 110 from an E1 span. First span interface processor 150 translates the communications data from an E1 format into a J1 format before passing the communications data along to upper level processors 135 for routing to second span interface processor 152 that is coupled to J1 interface 120. Second span interface processor 152 then transmits communications data routed by upper level processors 135 across a J1 span through J1 interface 120. Upper level processors 135 are configured to operate on communications data in J1 format, thus requiring that first span interface processor 150 translate communications data received from an E1 span from an E1 format into a J1 format before passing such communications data along to upper level processors 135 as described above. Thus, communications data entering switching device 40 from an E1 span is converted in format so as to be understandable by all components of switching device 40 to enable the communications data to be is transferred out of switching devices 40 on a J1 span.

Figure 3:
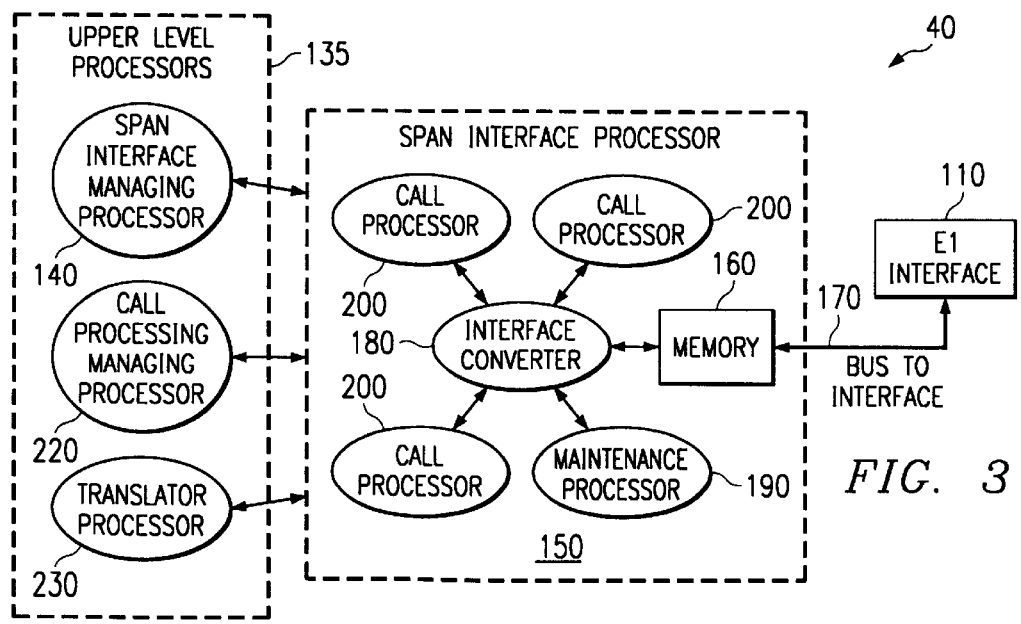
FIG. 3 is a block diagram of an embodiment of the switching device shown in FIG. 1 constructed according to the teachings of the present invention.

FIG. 3 is a block diagram of an embodiment of switching device 40 from FIGS. 1 and 2 that includes a span interface processor 150 in communication with E1 interface 110. Switching device 40 further includes upper level processors 135 including a span interface managing processor 140, a call processing managing processor 220 and translator processor 230, all in communication with span interface processor 150. In general, span interface processor presents communications data to high level processors 135 from E1 interface 110 as if it is communications data received from a J1 interface. Thus, processors 140, 220 and 230, and other higher level processors and applications not discussed herein, are all configured to operate using a J1 format when processing communications data.

Although not shown in FIG. 3, each switching device 40 may include a plurality of span interface managing processors 140, each of which may be in communication with a plurality of span interface processors 150. Some span interface processors 150 are in communication with E1 interfaces such as E1 interface 110 and some are in communication with J1 interfaces such as J1 interface 120 of FIG. 2. Thus, each switching device 100 is capable of interfacing with both E1 and J1 spans as shown in FIGS. 1 and 2.

Upper level processors 135 are high level processors utilizing and controlling communications data from span interfaces such as E1 interface 110 communicated by span interface processors such as span interface processor 140. Upper level processors 135 all perform high level call processing and are thus considered call processors for purposes of this invention.

Span interface managing processor 140 is a high level processor that manages communications from a plurality of span interface processors 150. Span interface managing processor 140 may include any combination of hardware or software necessary to configure and control communications from the plurality of span interface processors 150 to which span interface managing processor 140 is allocated. Each span interface managing processor 140, for example, may control up to 16 span interface processors 150. In general, span interface managing processor 140 executes higher level call processing functions to manage the call states of all calls associated with its span interface processors 150.

Call processing manager 220 is a high level processor, or other executable combination of hardware and software, that performs a variety of higher level call processing on communications signals received from E1 interface 110 that are associated with call billing, idleness determination of particular circuits, traffic metering, obtaining logistical data and measurements, and other high level call processing.

Translator processor 230 is a high level processor that translates communications signals received from E1 interface 110 corresponding to numbered digits that are dialed to initiate communications to a particular location.

Span interface processor 150 is a low level processor that controls access to and monitors communications data from E1 interface 110. Span interface processor 150 includes the necessary hardware and software to interface with, process, and store signals communicated across E1 interface 110. More particularly, span interface processor 150 includes: a memory 160 in communication with E1 interface 110 across a bus 170; an interface convertor 180 in communication with memory 160; and a maintenance processor 190 and call processors 200 in communication with interface convertor 180. Call processors 200 are also in communication with span interface managing processor 140, call processing manager processor 220 and translator processor 230, which use these lower level call processors to accomplish high level determinations and processes.

Maintenance processor 190 is a low level processor, or alternatively may be maintenance and configuration applications or routines, that monitors alarm signals from span interfaces such as span interface 110 or span interface 120 to look for faults in communications and to track call performance. Maintenance processor 190 may also reference or alter database settings responsible for configuring span interface use by span interface processor 150. For example, maintenance and configuration application 190 may receive a certain threshold of alarms or fault indications and may react by initiating the removal of a particular span interface from service.

Call processors 200 are lower level call processors or call processing applications that perform lower level call processing tasks. These tasks may include scanning tasks that involve monitoring circuits to determine if certain circuits are at on-hook or off-hook conditions. Call processors 200 may also initiate diagnostics or loopback testing, and may respond to alarm indications. Call processors 200 access and control alarm, signaling, diagnostic and loopback signals for immediate use by span interface processor 150 or for transfer to higher level call processing applications handled and executed by higher level processors 135 such as span interface managing processor 140, call processing manager 220, or translator processor 230. All call processors 200 and maintenance processor 190 access signaling data through interface convertor 180 described below. Thus, call processors 200 and maintenance processor 190 use a J1 format when submitting communications data requests or instructions to span interface processor 150.

Interface convertor 180 is any combination of hardware and/or software capable of causing E1 interface 110 to be emulated as a J1 interface for purposes of interacting with lower level processors such as call processors 200 and maintenance processor 190, and thus, indirectly, with all upper level processors 140, 220, and 230. In one embodiment, interface convertor 180 is a thin software layer integrated with call processors 200 and maintenance processor 190 to emulate a J1 interface for purposes of interacting with the rest of switching device 100. In general, interface convertor 180 receives addresses of memory 160, and specific bit locations within those memory addresses, from call processors 200 or maintenance processor 190 that specify the locations of particular pieces of signaling data.

As processors 190 and 200 are configured based upon J1 formatted communications data, the address and bit location correspond to an expected location of a particular piece of signaling data based upon an expected J1 format or memory map. If span interface processor 150 is in communication with E1 interface 110, the format or memory map expected by a requesting processor is incorrect. As a result, without interface convertor 180 the requesting processor would access the wrong piece of communications data. Thus, upon receiving the supplied address and bit location of a particular piece of signaling data according to the expected J1 format or memory map, interface convertor 180 is operable to translate both the J1 memory address and bit location supplied by processors 200 and 190 into a corresponding E1 memory address and bit location according to an actual E1 format or memory map. For example, a piece of signaling data indicating that a particular circuit is on-hook may correspond to a J1 memory address of E100 and a bit location of 7, but may be translated by interface convertor 180 into an E1 format wherein the comparable or equivalent piece of signaling data exists in E1 format at address E100 but at bit location 2.

Memory 160 may be an array of memory registers containing communications data that is accessed by span interface processor 150 from E1 interface 110. Memory 160 may also be any other arrangement or structure of memory including arrays, queues or tables. The communications data stored in memory 160 is accessed by span interface processor 150 from registers of E1 interface 110 at regular intervals. For example, memory 150 may receive signaling data over bus 170 from the registers of E1 interface 110 at an interval of every ten milliseconds. Alarm indications or other faults may need to be accessed at shorter intervals. As discussed, a particular span interface processor 150 in communication with E1 interface 110 will store communications data according to an E1 format or memory map.

As discussed, E1 interface 110 stores communications data received from or to be transmitted on an E1 span in registers according to an E1 format. Each E1 interface 110 may be coupled to two spans, each span containing 32 channels or circuits as previously discussed. Incoming communications data from each of the 64 circuits is latched into the registers of E1 interface 110 as it is received.

Figure 4:
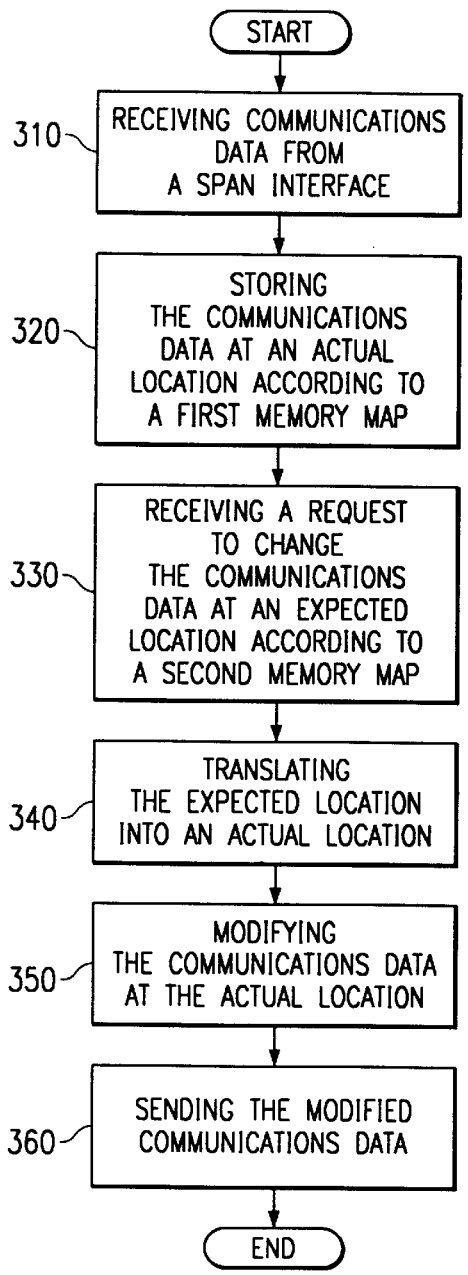
FIG. 4 is a flow chart of an embodiment of the process of communications data translation during data modification by a call processor according to the teachings of the present invention.

FIG. 4 is a flow chart illustrating communications data translation during data modification by a call processor 200 according to the teachings of the present invention. In step 310, memory 160 from FIG. 3 receives signaling data that is stored in the registers of E1 interface 110 across bus 170. In step 320, memory 160 stores the communications data according to a first memory map or E1 format. In step 330, interface convertor 180 receives a request from call processor 200 to alter the communications data at an expected address and bit location according to a second memory map or J1 format. Thus, the request from call processor 200 includes a memory address and a bit position within that memory address where call processor 200 expects the communications data to appear in J1 formatted registers. Next, in step 340, interface convertor 180 translates the expected address and bit position of the communications data supplied by call processor 200 from the expected J1 format into a corresponding and actual memory address and bit position in E1 format. Next, in step 350, interface convertor 180 accesses the newly mapped address location and bit position in memory 160 and modifies the specified bit according to the instructions of the call processor 200. In step 360, having received a modification to the stored communications data, memory 150 transfers the communications data containing the changed bit across bus 170 to a corresponding register address in E1 span interface 110 for transmission along an E1 span.

Figure 5:
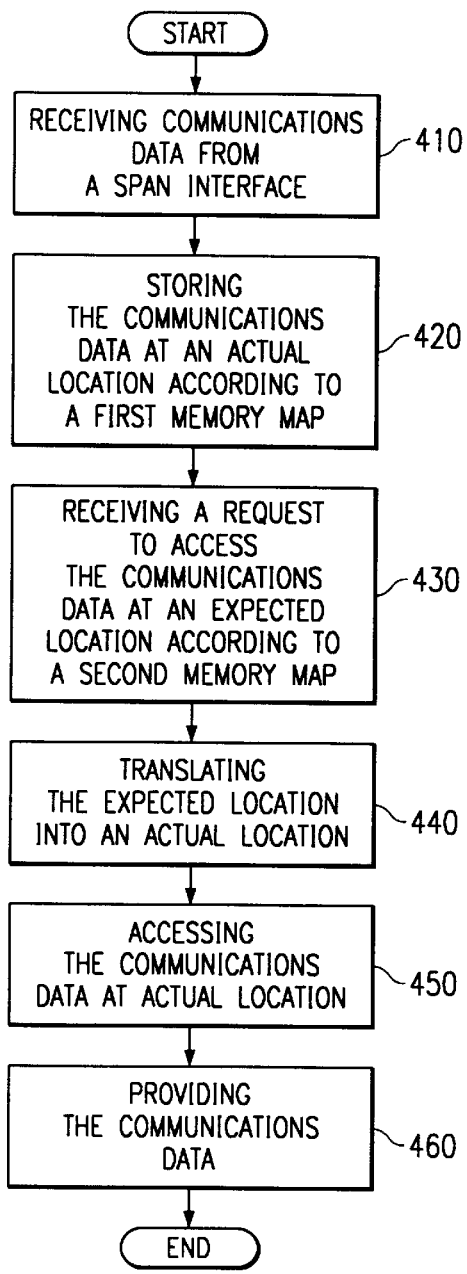
FIG. 5 is a flow chart of an embodiment of the process of communications data translation during data access and retrieval by a call processor according to the teachings of the present invention.

FIG. 5 is a flow chart illustrating the mapping of communications data translation during data access and retrieval by a call processor according to the teachings of the present invention. In step 410, memory 160 from FIG. 3 receives signaling data that is stored in the registers of E1 interface 110 across bus 170. In step 420, memory 160 stores the communications data according to a first memory map or E1 format. In step 430, interface convertor 180 receives a request from call processor 200 to access the communications data at an expected address and bit location according to a second memory map or J1 format. Thus, the request from call processor 200 includes a memory address and a bit position within that memory address where call processor 200 expects the communications data to appear in J1 formatted registers. Next, in step 440, interface convertor 180 translates the expected address and bit position of the communications data supplied by call processor 200 from the expected J1 format into a corresponding and actual memory address and bit position in E1 format. Next, in step 450, interface convertor 180 accesses the newly mapped address location and bit position in memory 160 to obtain the designated communications data. In step 460, the accessed communications data is sent to the requesting call processor 200 to be used in call processing or to be sent out over J1 interfaces and across J1 spans.

Table A is a mapping chart showing the relationship between E1 alarm indications and J1 alarm indications. E1 alarm indications are stored at interface address E409. J1 alarm indications are stored at both interface address E304 and E306. In general, Table A maps correspondence between E1 and J1 alarm indication memory maps according to functionality. Such memory maps are used by interface convertor 180 to translate requests by call processors 200, for example.

TABLE A

| E1 Alarm<br>Address E409 | J1 Alarm<br>Address E304 |
|---|---|
| Received frame loss (bit 7) | Receive error. (bit 7) |
| Received AIS. (bit 6) | Send error. (bit 6) |
| Remote alarm. (bit 3) | Send error. (bit 6) |
| Received local multiframe. (bit 5) | Frame lock error. (bit 5) |
| Received remote multiframe. (bit 4) | Frame lock error. (bit 5) |
| Received AIS16. (bit 2) | Frame lock error. (bit 5) |
| Address E409 | Address E306 |
| Received frame loss. (bit 7) | Transmit send alarm. (bit 7) |

Some bit locations in a particular address may correspond to a different alarm indication depending on the prior states of particular types of signaling data. Thus, E1 alarm indication received frame loss can map to bit 7 of address E304 or E305 of the 31 alarm memory map depending on a current state.

Table B is a mapping chart showing the relationship between E1 signaling indications and J1 signaling indications. E1 inbound signaling indications are stored at hardware interface address E000 and E1 outbound signaling indications are stored at hardware interface address E100. J1 inbound signaling indications are stored at hardware interface address E000 and J1 outbound signaling indications are stored at address E100. In general, Table B maps correspondence between E1 and J1 alarm indication signaling maps according to functionality. Again, such memory maps are used by interface convertor 180 to translate requests by call processors 200, for example.

TABLE B

| Inbound Signaling | |
|---|---|
| E1 Signaling<br>Address E000 | J1 Signaling<br>Address E000 |
| A bit (bit 3)<br>B bit (bit 2) | RxST (bit 7) |

| Outbound Signaling | |
|---|---|
| E1 Signaling<br>Address E100 | J1 Signaling<br>Address E100 |
| A bit (bit 7)<br>B bit (bit 6) | TxST (bit 7) |

Table C is a mapping chart showing the translation of E1 diagnostic indication to J1 diagnostic indications. E1 diagnostic indications are located at hardware interface address E503 and J1 diagnostic indications are located at hardware interface address E301. In general, Table C maps correspondence between E1 and J1 alarm indication diagnostic maps according to functionality. Here to, such memory maps are used by interface convertor 180 to translate requests by call processors 200, for example.

TABLE C

| E1 Diagnostic<br>Address E503 | J1 Diagnostic<br>Address E301 |
|---|---|
| Emulate bit. (bit 1) | M20 interface. (bit 0) |
| In/Out buffer select. (bit 0) | Tx/Rx buffer select. (bit 1) |
| Disable PCM read. (bit 2) | Disable PCM read. (bit 4) |
| Disable outbound PCM write. (bit 5) | Disable PCM write. (bit 7) |
| Disable inbound PCM 0 write. (bit 3) | Disable span A write. (bit 6) |
| Disable inbound PCM 1 write. (bit 4) | Disable span B write. (bit 5) |

Table D is a mapping chart showing the translation of E1 loopback indications to J1 loopback indications. E1 loopback indications are stored at address E501 and J302 loopback indications are stored at address E302. In general, Table D maps correspondence between E1 and J1 alarm indication loopback maps according to functionality. Such memory maps are also used by interface convertor 180 to translate requests by call processors 200, for example.

TABLE D

| E1 Loopback<br>Address E501 | J1 Loopback<br>Address E302 |
|---|---|
| Outbound MUX select. (bits 3 & 2) | Span loopback. (bit 5) |
| Inbound MUX select. (bit 4) | Switch loopback. (bit 4) |
| Outbound PCM aux select. (bit 5) | Aux out enable. (bit 6) |
| Inbound PCM aux select. (bit 6) | Aux in select. (bit 7) |

It should be noted that various alarm, signaling, diagnostic and loopback indications may not have a corresponding indication when going from one span type to another. For example, a multiframe out of lock alarm E1 alarm indication has no meaningful counterpart for translation to a J1 alarm indication. It should also be noted that the list of communications data and indications described in FIGS. 5 through 8 do not encompass all relationships between E1 signaling data and J1 signaling data, but such signaling data that is not described can easily be mapped based on the descriptions and methods described herein, provided such J1 signaling data exists that corresponds to such E1 signaling data. Thus, the specific mapping described in Tables A through D merely provide examples of significant signaling data and discloses how mapping occurs between corresponding pieces of signaling data in E1 and J1 interface addresses.

It should be understood that although a switching device 100 and span interface processor 150 is described in reference to a switch configured for J1 span interfaces needing to communicate with a certain number of E1 span interfaces 110, the ideas, techniques, and invention described herein is equally applicable and readily apparent to switches operating under the following conditions: (1) a switch otherwise configured for E1 span interfaces that needs to communicate and interact with J1 or T1 span interfaces; (2) a switch otherwise configured to interact with J1 span interfaces that needs to communicate and interact with T1 span interfaces; or (3) a switching device 100 otherwise configured to communicate and interact with T1 span interfaces that needs to communicate and interact with either E1 span interfaces or J1 span interfaces. The structure, ideas, and processes described herein are thus applicable in all of these described switching configurations.

Although the present invention and its advantages have been described in detail, it should be understood that various changes, substitutions, and alterations can be made therein without departing from the spirit and scope of the invention as defined by the appended claims.

What is claimed is:

1. A system for switching communications signals between a first communications network and a second communications network, comprising:
   a J1 interface coupled to the first communications network by a J1 span;
   an E1 interface coupled to the second communications network by an E1 span; and
   a first interface processor in communication with the J1 interface and the E1 interface, the first interface processor operable to translate signals formatted for the J1 span into an E1 format for transmission on the E1 span, the first interface processor further operable to translate communications signals formatted for the E1 span into a J1 format for transmission on the J1 span;
   a second interface processor operable to send communications data to the J1 interface and wherein the first interface processor transfers the translated communications signals from the first interface processor to the second interface processor for transmission to the second communications network across the J1 interface.

2. A method of switching communications signals, comprising:
   receiving communications data from a span interface;
   storing the communications data in a memory according to a first memory map;
   receiving a request from a call processor, the request referencing the communications data by indicating an expected location according to a second memory map;
   translating the expected location into an actual location according to the first memory map in response to receiving the request; and
   responding to the request using the communications data stored at the actual location.

3. The method of claim 2, wherein receiving the request further comprises receiving a request to access the communications data in the memory.

4. The method of claim 3, wherein responding to the request comprises:
   accessing the communications data at the actual location in the memory; and
   providing the communications data to the call processor.

5. The method of claim 2, further comprising:
   receiving a change request to change the stored communications data.

6. The method of claim 5, further comprising:
   responding to the change request by modifying the stored communications data at the actual location in the memory according to the request.

7. The method of claim 6, further comprising;
   sending the modified communications data to the span interface.

8. The method of claim 2, wherein responding to the request further comprises sending the communications data to a second span interface.

9. A system for processing communications signals transferred between a first communications network and a second communications network, comprising:
   a first span interface coupled to the first communications network by a first digital communications link, the first digital communications link operable to transfer communications data in a first format, the first span interface operable to store the communications data according to the first format;
   a second span interface coupled to the second communications network by a second digital communications link, the second digital communications link operable to transfer communications data in a second format, the second span interface operable to store the communications data according to the second format; and
   an interface processor in communication with the first span interface and the second span interface, the interface processor configured to process communications data stored in the second format, the interface processor including a span converter operable to translate the format of the communications data from the first format to the second format to allow further processing of the communications data by the interface processor, the span converter operable to translate the first format to the second format in response to a request referencing the communications data stored according to a first memory map associated with the first format, the request indicating an expected location according to a second memory map associated with the second format, the span interface operable to translate the expected location into an actual location according to the first memory map in response to receiving the request.

10. The system of claim 9, wherein the interface processor translates the format of the communications data in response to requests from call processors.

11. A system for processing communications signals transferred between a first communications network and a second communications network, comprising:
   a first span interface coupled to the first communications network by a first digital communications link, the first digital communications link operable to transfer communications data in a first format, the first span interface operable to store the communications data according to the first format;
   a second span interface coupled to the second communications network by a second digital communications link, the second digital communications link operable to transfer communications data in a second format, the second span interface operable to store the communications data according to the second format; and
   an interface processor in communication with the first span interface and the second span interface, the interface processor configured to process communications data stored in the second format, the interface processor including a span converter operable to translate the format of the communications data from the first format to the second format to allow further processing of the communications data by the interface processor;
   an upper level processor in communication with the first and second span interfaces and the interface processor, the interface processor providing the translated communications data to the upper level processor, the upper level processor routing the translated communications data to the second span interface.

12. The system of claim 11, wherein the upper level processor is operable to process data only in the second format.

13. The system of claim 9, wherein the first digital communications link is an E1 span.

14. The system of claim 9, wherein the second digital communications link is a J1 span.

15. A system for processing communications signals received from a communications network, comprising:
- a span interface coupled to the communications network by a digital communications link, the digital communications link operable to transfer communications data in a first format, the span interface operable to store the communications data in the first format;
- a switching device coupled to the span interface, the switching device including:
  - an upper level processor configured to process communications data in a second format;
  - a span interface processor in communication with the span interface and the upper level processor, the span interface processor operable to access the stored communications data and translate the accessed communications data from the first format to the second format in response to a data access request from the upper level processor.

16. The system of claim 15, wherein the span interface processor accesses alarm indications in response to the data access request.

17. The system of claim 15, wherein the span interface processor accesses signaling indications in response to the data access request.

18. The system of claim 15, wherein the span interface processor accesses diagnostic indications in response to the data access request.

19. The system of claim 15, wherein the span interface processor accesses loop back indications in response to the data access request.

20. The system of claim 15, wherein the span interface processor responds to a data access request by the upper level processor by comparing an address and bit location supplied by the request to a first memory map associated with the second format and translating the address and bit location to a different address and bit location based on a second memory map associated with the first format.

21. The system of claim 15, wherein the first format is an E1 format and the second format is a J1 format.

22. A system for processing communications signals received from a communications network, comprising:
- a span interface coupled to the communications network by a digital communications link;
- a span interface processor in communication with the span interface, the span interface processor operable to receive communications data from the span interface, the communications data being transferred to the span interface across the digital communications link, the span interface processor operable to store the communications data in a memory according to a first memory map, the span interface processor including:
  - a call processor operable to generate a call processing request referencing the stored communications data by indicating an expected location according to a second memory map; and
  - a span converter in communication with the call processor and the memory, the span converter operable to respond to the request by translating the expected location into an actual location according to the first memory map and by using the communications data stored at the actual location.

23. The system of claim 22, further comprising an upper level processor for routing communications data received by the span interface from the first communications network to a second span interface for transmission to a second communications network.

24. The system of claim 22, wherein the first memory map comprises a memory map of alarm, signaling, diagnostic and loop back indications in E1 format.

25. The system of claim 22, wherein the second memory map comprises a memory map of alarm, signaling, diagnostic and loop back indications in J1 format.

26. The system of claim 22, wherein the span converter translates alarm, signaling, diagnostic and loop back indication address and bit locations between E1 and J1 formats according to the first and second memory maps.

* * * * *